(12) United States Patent
Rowe et al.

(10) Patent No.: US 7,747,010 B1
(45) Date of Patent: Jun. 29, 2010

(54) TELEPHONY SOFTWARE CLIENT APPLICATION FOR HANDLING THE INSERTION AND REMOVAL OF LOGICAL AUDIO DEVICES

(75) Inventors: Charles Rowe, Pheonix, AZ (US); Keith Weiner, Queen Creek, AZ (US)

(73) Assignee: Avaya Inc., Basking Ridge, NJ (US)

( * ) Notice: Subject to any disclaimer, the term of this patent is extended or adjusted under 35 U.S.C. 154(b) by 173 days.

(21) Appl. No.: 12/099,129

(22) Filed: Apr. 7, 2008

Related U.S. Application Data

(60) Provisional application No. 60/922,197, filed on Apr. 5, 2007.

(51) Int. Cl.
*H04M 1/00* (2006.01)
*H04M 9/00* (2006.01)
*H04M 1/64* (2006.01)

(52) U.S. Cl. .................... 379/447; 379/419; 379/67.1
(58) Field of Classification Search ............... 379/67.1, 379/90.01, 101.01, 201.01, 419, 441, 447, 379/457
See application file for complete search history.

(56) References Cited

U.S. PATENT DOCUMENTS

| | | | | |
|---|---|---|---|---|
| 5,502,839 | A | * | 3/1996 | Kolnick ..................... 710/1 |
| 2003/0156686 | A1 | * | 8/2003 | Pines ..................... 379/67.1 |
| 2004/0252813 | A1 | * | 12/2004 | Rhemtulla et al. ......... 379/67.1 |

* cited by examiner

*Primary Examiner*—Tuan D Nguyen
(74) *Attorney, Agent, or Firm*—Withrow & Terranova, P.L.L.C.

(57) ABSTRACT

A telephony software client application for handling the insertion and removal of logical audio devices.

20 Claims, 5 Drawing Sheets

TELEPHONY SOFTWARE CLIENT APPLICATION FOR HANDLING THE INSERTION AND REMOVAL OF LOGICAL AUDIO DEVICES

The present application is an application claiming the benefit under 35 USC Section 119(e) of U.S. Provisional Patent Application Ser. No. 60/922,197, filed Apr. 5, 2007. The present application is based on and claims priority from this application, the disclosure of which is hereby expressly incorporated herein by reference in its entirety.

COPYRIGHT NOTICE

A portion of the disclosure of this patent document contains material which is subject to copyright protection. The copyright owner has no objection to the facsimile reproduction of the patent disclosure as it appears in the Patent and Trademark Office patent files or records, but otherwise reserves all copyright rights whatsoever.

BACKGROUND OF INVENTION

The present invention is directed to a telephony software client application, and more specifically to a telephony software client application for handling the insertion and removal of logical audio devices.

The "hardware" telephone is often considered second in impact only to the printing press for revolutionizing human communication. Primarily providing the function of allowing two-way acoustic communications, the invention of the telephone radically and permanently changed every aspect of human affairs, from business to daily life. The basic concept of a telephone, however, is relatively simple. A telephone mouthpiece translates acoustic vibrations (e.g. human speech) into electrical signals or energy. The electrical signals are transmitted over a wire to a telephone speaker on the other end of the wire. The telephone speaker converts the electrical signals back into acoustic vibrations or energy so that they are audible to a listener.

The term "telephony software" is used to describe a telephony software client, software providing telephone functions, and/or a "software" telephone (e.g. Voice over IP (VoIP), Voice Chat, Skype™, and/or other software telephones). Telephony software performs the same function(s) as a hardware telephone (two-way acoustic communications), but accomplishes these functions using the physical components and/or accessories of a general-purpose computer (hereinafter referred to generally as a "computer"). A computer may be, for example, a desktop or laptop computer, a workstation, a handheld technical device (e.g. a Pocket PC® device, a Palm® device, or a Blackberry® device), an interactive television, a kiosk, a dedicated device, or virtually any current or future interactive technology. The physical components and/or accessories used by telephony software include processors, memory, speakers, microphones, modems, network adapters, audio hardware, and other physical components and/or accessories. Using a computer and a microphone, audio sounds are "captured" (or recorded) into the computer memory. The capturing process involves sampling audio sounds at a very high rate (e.g. at least 8,000 times per second or more). Next, the captured "samples" are compressed. There are a number of ways to compress audio, the algorithm for which is referred to as a "compressor/de-compressor" (CODEC). The CODECs may be optimized for particular purposes. The samples are then collected together and placed into "data packets" (packetization) for transmission over the IP network to another computer (or other device capable of receiving audio, including a traditional telephone). The data are "played" on the receiving device such that the audio sounds are "released" (or rendered) through the speakers of the receiving device.

Although there is no standard on how a computer handles sound, most computers have some type of audio hardware (e.g. an audio adapter, a sound card, a sound generating device, or a chip on the motherboard). Most computers also typically have at least one audio line (e.g. a headphone jack or internal circuit) that is associated with the audio hardware. Sound components or accessories such as transducers (e.g. headphones, microphones, and headsets) may be physically "plugged" into audio lines, hardwired internally, or may be connected wirelessly.

A general-purpose operating system (e.g. Windows Vista®, Windows 95®, Windows 98®, Windows CE®, Windows Me®, Windows NT®, Windows2000®, Linux®, MacOS®, BeOS®, or virtually any current or future operating system) of a computer controls audio using "logical audio devices 20" (a logical audio device (or LAUD) is a device-independent abstraction of an audio resource). Although logical audio devices 20 may be device-independent, they may have some relation to components such as "input transducers" (e.g. microphones), "output transducers" (e.g. speakers), "dual-direction transducers" (e.g. headsets with both input and output capabilities), audio hardware (e.g. audio adaptors and sound cards), audio lines (e.g. jacks associated with audio hardware), and/or combinations or sub-sets of the above mentioned "components." FIG. 1 is a screen shot of a simplified window showing an expanded listing of logical audio devices 20 recognized for output (sound playback or rendering) and an expanded listing of logical audio devices 20 recognized for input (sound recording or capturing). The drop-down menu for the output shows that there are six logical audio devices 20 recognized for output by the operating system. The drop-down menu for the input shows that there are six logical audio devices 20 recognized for input by the operating system. Although the lists of logical audio devices 20 recognized for input and output are shown in this exemplary embodiment as being similar (some of the devices appear to be the same or related), they could be identical or significantly different. Further, the lists of logical audio devices 20 recognized for input and output are dynamic and can change. It should be emphasized that the logical audio devices 20 do not necessarily correspond to any single physical component. For example, one sound card may control eight (8) audio lines (two (2) rear outputs, two (2) front outputs, two (2) rear inputs, and two (2) front inputs), but be represented as four (4) logical audio devices 20 (e.g. as shown in FIG. 1 as HD Rear Output, HD Front Output, HD Rear Input, and HD Front Input). Another example is that a single headset may be represented as two (2) logical audio devices 20 (e.g. PQR Headset is represented both as an input logical audio device 20 and an output logical audio device 20).

A "default logical device 22" is the logical audio device 20 currently designated as appropriate to handle audio (or components of audio). In FIG. 1, for example, the default logical device 22 for output is the PQR Headset and the default logical device 22 for input is the PQR Headset. Although shown in this example as having the same name (which may or may not be the same component), the output and input for this operating system can be different (e.g. the output could be "Speakers" and the input could be "Microphone"). There may be one default logical device 22 for all audio applications or specific default logical devices for specific audio applications. In other words, one logical audio device may be the default logical device 22 that the operating system will designate to all types of audio (e.g. a headset may handle both input and output audio). Alternatively, there may be a specific default device designated for each different type of audio (e.g. one for input and one for output).

There are two ways that a default logical device 22 is determined: by the operating system and by user selection. The operating system can determine which logical audio device is the default logical device 22 based on default device determination factors such as heuristics (e.g. operating system predetermined rules such as setting the computer speakers as the default), component demands (e.g. the component manufacturer automatically changing the default to its own component), and/or other default device determination factors. The user can also select which logical audio device is the default logical device 22 using selection graphical user interfaces (GUIs) such as drop down menus, selection buttons, and other known selection GUIs.

Standardized communication protocols such as USB, WiFi, and Bluetooth have been developed to help standardize interfacing and communication between computers, accessories, and/or components. One way that these standardized communication protocols function properly is to include additional features with enabled accessories and/or components. For example, USB, WiFi, and Bluetooth audio components such as audio transducers (e.g. input transducers, output transducers, and dual-direction transducers) may include their own associated built-in audio hardware and/or audio line(s) (hereinafter jointly referred to as a "combination audio component"). The combination audio component may be recognized as one or more logical audio devices by the operating system of the computer. For purposes of this specification, combination audio components may use any communication protocol known or yet to be developed, but are particularly combination audio components using standardized communication protocols.

During a telephony session using telephony software and a traditional sound component or accessory such as an audio transducer (e.g. an input transducer, an output transducer, or a dual-direction transducer), the telephony software relies on the default logical device 22 designated by the operating system (regardless of whether it is determined by the operating system or by user selection). If the default logical device 22 represents the audio line directly or indirectly associated with the audio transducer, then sound (audio) is input and/or output using the audio transducer. If the transducer is removed from the audio line (e.g. the headset is removed from a jack), the connection is "broken" (e.g. sound may be interrupted or "cut off"). Inserting another transducer into the same audio line (e.g. a new headset is inserted into the same jack), however, would cause a new connection to be made and the default logical device 22 would be used to handle sound. If, however, another transducer (or the same transducer) was inserted into a new audio line (e.g. a headset being inserted into another jack), the new audio line (or its associated logical audio device 20) would not be the default logical device 22 and the new audio line would not be able to handle sound unless the user selected the new audio line's associated logical audio device 20 as the new default logical device 22.

An example of how the prior art works is a relatively typical laptop (computer) with a single audio adapter or sound card (audio hardware) and traditional sound components or accessories (e.g. built-in speakers). The operating system treats the audio hardware as a single audio line. As there is only a single audio line, it is designated as the default logical device 22. A new traditional sound component or accessory (e.g. a headset) can be plugged and unplugged into the audio hardware without the need for the telephony software to do anything. Sounds normally come through the speakers, but if the headset is plugged into a headphone jack, the sound will switch to the headset and the speakers will cut off. The telephony software does not know, and does not need to take any action, because there is only one sound card device in the laptop and it is designated as the default logical device 22.

BRIEF SUMMARY OF THE INVENTION

The present invention is directed to a telephony software client application, and more specifically to a telephony software client application for handling the insertion and removal of logical audio devices.

The present invention is directed to a method implemented by a client application for use with telephony software operating on a computer having an operating system and one or more logical audio devices. The client application handles the insertion and removal of logical audio devices. After a first logical audio device having priority status is opened as an open logical audio device, the client application waits for notification of insertion or removal of a logical audio device. If notification is received of the insertion of a new logical audio device, the logical audio device is an inserted replacement logical audio device, and the client application determines if the inserted replacement logical audio device has priority status. If the inserted replacement logical audio-device has priority status, the client application opens the inserted replacement logical audio device. If the inserted replacement logical audio device does not have priority status, the client application continues to wait for notification. If notification is received of the removal of the logical audio device, the client application determines if the original removed logical audits device is the open logical audio device or if the original removed logical audio device has priority status. If the original removed logical audio device is not the open logical audio device or if the original removed logical audio device does not have priority status, the client application continues to wait for notification. If the original removed logical audio device is the open logical audio device or if the original removed logical audio device has priority status, the client application opens the assumed replacement logical audio device.

The foregoing and other objectives, features, and advantages of the invention will be more readily understood upon consideration of the following detailed description of the invention, taken in conjunction with the accompanying drawings.

DETAILED DESCRIPTION OF THE INVENTION

The present invention is directed to a client application for use with telephony software, and more specifically to a telephony software client application for handling the insertion and removal of logical audio devices 20. Still more specifically, the present invention is directed to a telephony software client application operating (running) on a computer with one or more logical audio devices 20 that may be inserted or removed dynamically. It should be noted that the client application may be separate from or integrated with the telephony software.

The telephony software client application of the present invention is designed to handle computers that have the capacity to handle simultaneously three or more logical audio devices, but is capable of functioning with computers that can only handle one or two logical audio devices. This can be compared to some cellular phone peripherals that are used with some cellular handsets designed to handle two transducers (e.g. a wireless headset or a built-in speaker phone). This type of cellular phone has the ability to switch between the transducers. But this type of cellular handset is "dumb." There is no logical audio device abstraction layer. There are no decision points such as those used in the preferred embodiments of the present invention.

Figure 1:
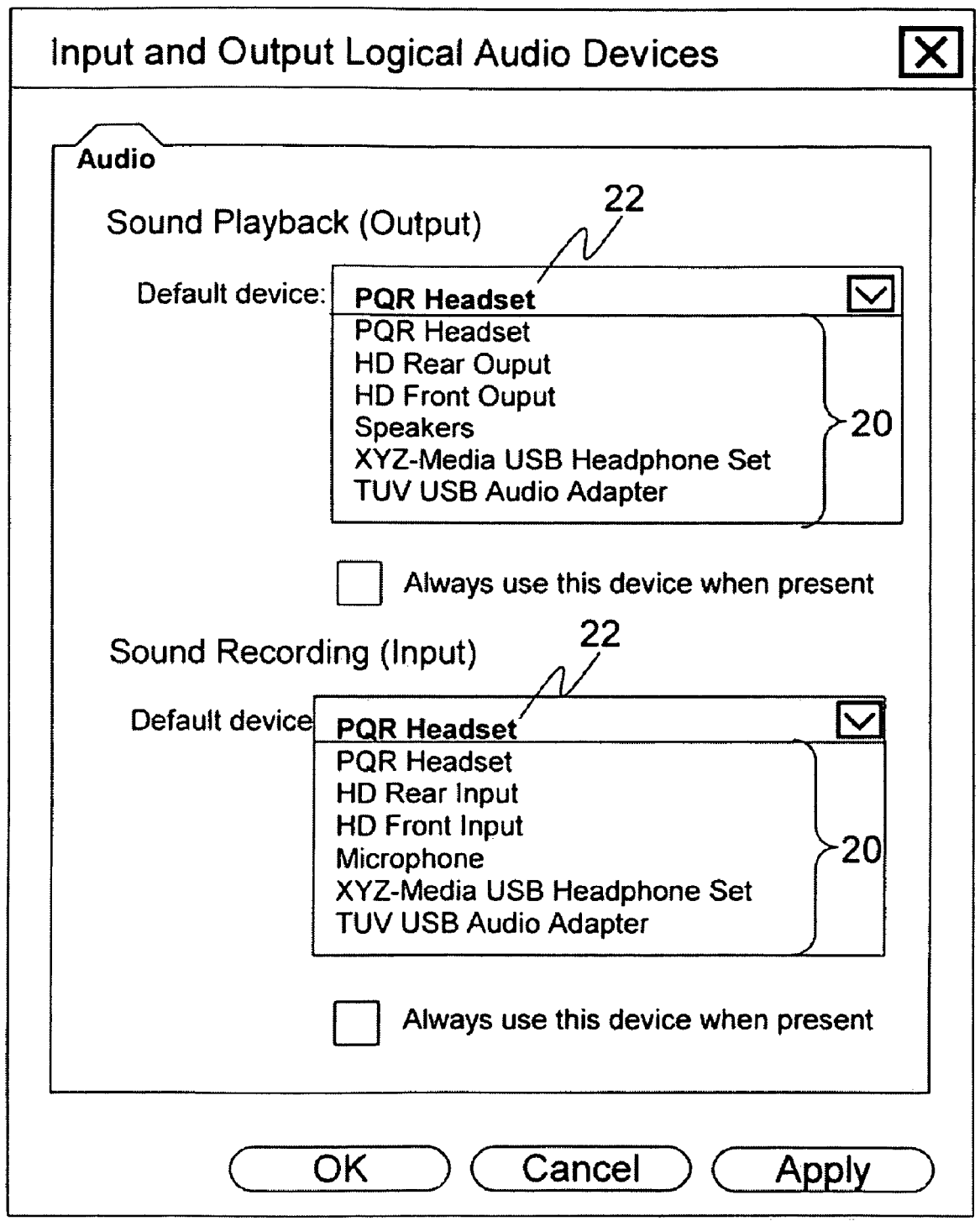
FIG. 1 is a simplified window showing an expanded listing of logical audio devices recognized for output and an expanded listing of logical audio devices recognized for input.

As set forth in the Background and shown in FIG. 1, the "default logical device 22" is the logical audio device 20 currently designated by the operating system as appropriate to handle audio (or elements of audio such as input or output). There are two ways that a default logical device 22 is determined: by the operating system and by user selection. It should be noted that the window shown in FIG. 1 is a GUI through which the user may select the logical audio device 20 and, in some embodiments, may be accessed through the "control panel" of the computer operating system.

Combination audio components may be recognized as one or more logical audio devices by the operating system of the computer. Unlike some logical audio devices 20 (e.g. those hardwired into a computer), logical audio devices 20 associated with combination audio components can be inserted or removed dynamically while the computer is operating. Graphically, when the operating system of the computer recognizes a combination audio component, it would add the appropriate logical audio device(s) 20 to the lists (shown as one for output and one for input) of logical audio devices 20 in the GUI of FIG. 1.

Known telephony software handles logical audio devices 20 using the operating system's designated logical device(s) 22 for audio output and/or audio input. The designated logical device(s) 22, however, can be determined by the operating system or the operating system can allow the user to select the default logical device(s) 22 for audio output and/or audio input.

Using an operating system, telephony software applications that provide audio output and/or audio input can be said to "open" a logical audio device 20. Once the logical audio device 20 is open, the telephony software can provide output or input audio until it closes the logical audio device 20. General-purpose software is used to open the default logical device 22 using a simple code (e.g. a function call to Windows®). Similarly, using the operating system, telephony software can be said to "close" a logical audio device 20. Once the logical audio device 20 is closed, the telephony software can no longer provide output or input audio. General-purpose software is used to close the default logical device 22 using a simple code (e.g. a function call to Windows®).

Conventional telephony software, however, cannot dynamically change logical audio devices 20 while outputting and inputting audio (e.g. during a telephony session). Conventional telephony software cannot even handle the removal and replacement of the same logical audio device during a telephony session. The situation of inserting and/or removing a combination audio component (that may be recognized as one or more logical audio devices 20 by the operating system of the computer) during a telephony session using telephony software will generally have problems similar to the problems of the situation described in the Background, and pertaining to telephony sessions using telephony software in which a traditional sound component or accessory such as an audio transducer is inserted or removed. In both situations, the telephony software relies on the default logical device 22 designated by the operating system. If the default logical device 22 represents the audio line directly or indirectly associated with the audio transducer, then sound is input and/or output using the combination audio component or the audio transducer. The connection is "broken" (e.g. sound may be interrupted or "cut off") if the combination audio component is disconnected from the computer or the transducer is removed from the audio line (e.g. the headset is removed from a jack). Using the traditional sound component or accessory as described in the Background, inserting another transducer into the same audio line (e.g. a new headset inserted into the same jack) would cause a new connection to be made and the default logical device 22 would be used to handle sound, but inserting another transducer (or the same transducer) into a new audio line (e.g. a headset inserted into another jack) would not work unless the user selected the new audio line (represented by its associated logical audio device 20) as the new default logical device 22. On the other hand, connecting either the same combination audio component or a different combination audio component would not work unless the user selected the new combination audio component (represented by its associated logical audio device 20) as the new default logical device 22. However, because the telephony software would not be sensitive to the change in the operating system's default logical device 22, the telephony session most likely would have to be "stopped" and "restarted" (or the user would have to manually notify the telephony software of the change) once the new default logical device 22 had been selected in order to make the change. This is because when the combination audio component is removed, its associated audio line(s) is/are removed. Therefore, the logical audio device(s) 20 associated with the combination audio component are also removed from the list. Reinserting the same combination audio component, therefore, would be seen by the operating system (and the telephony software) as the insertion of at least one new logical audio device 20.

The client application of the present invention handles the dynamic insertion and removal of logical audio devices 20 (e.g. combination audio components that are recognized as one or more logical audio devices by the operating system of the computer) during a telephony session without experiencing the problems associated with prior art and described above. The client application of the present invention accomplishes this using a method that includes the steps of (1) waiting for notification of a logical audio device 20 insertion and/or removal, (2) using logic to determine which logical audio device 20 to use, (3) closing the old (first or original) logical audio device 20 (theoretically this is an optional step, although preferred embodiments would include it), and (4) opening the new (second or replacement) logical audio device 20. The closing and opening steps could be combined as a single step. It should be noted that the terms "old" and "new" are meant to be relative terms designating order. In the situation of device insertion, the "old" logical audio device 20 would be the original (prior to insertion) logical audio device 20 and the "new" logical audio device 20 would be the "inserted replacement" (after insertion) logical audio device 20 that replaces the original logical audio device 20 if the inserted logical audio device 20 has "priority status" (either as the operating system designated "default logical device 22" or as the "user pre-selected preferential logical audio device 26"). In the situation of device removal, if the logical audio device 20 being removed (the "old" or "original removed") is not the open logical audio device 20, the currently open logical audio device 20 continues as the open logical audio device 20 and the client application returns to waiting for notification. If, however, the logical audio device 20 being removed (the "old" or "original removed") is open, then a "new" logical audio device 20 would be determined using priority status information. In this situation, the "old" logical audio device 20 would be the original (prior to removal) logical audio device 20 (the logical audio device 20 that is to be removed) and the "new" logical audio device 20 would be the assuming replacement logical audio device 20 (the logical audio device 20 that assumes the audio function(s) previously handled by the removed logical audio device 20). The logical audio device 20 that assumes the audio function(s) would be considered "new" even if it had been previously used or otherwise had handled the audio function(s) before the removed logical audio device 20.

Exemplary Embodiments

Figure 2:
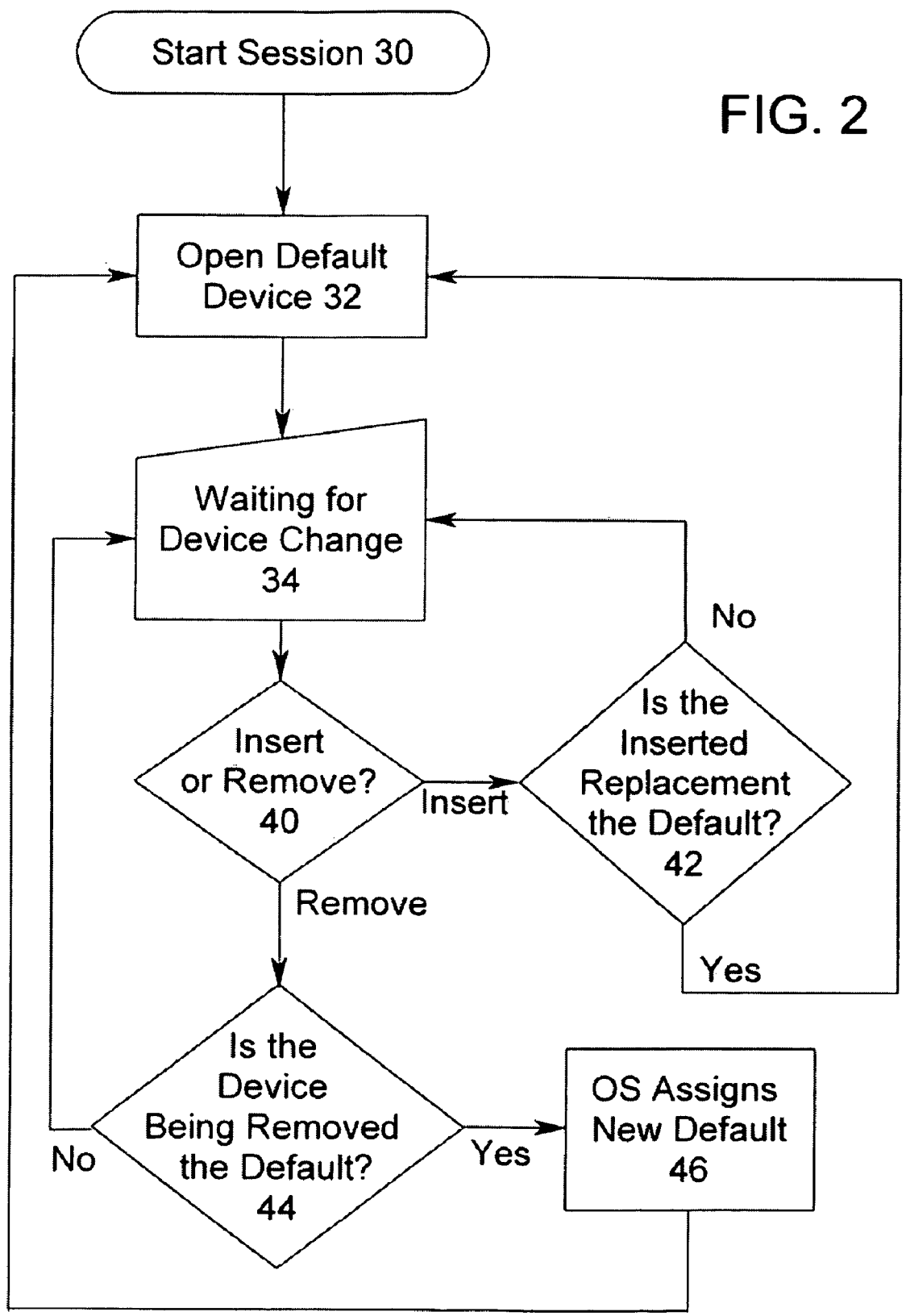
FIG. 2 is a flowchart showing a first exemplary telephony software client application of the present invention in which the inserted and/or removed logical audio device is the default logical device.
Figure 3:
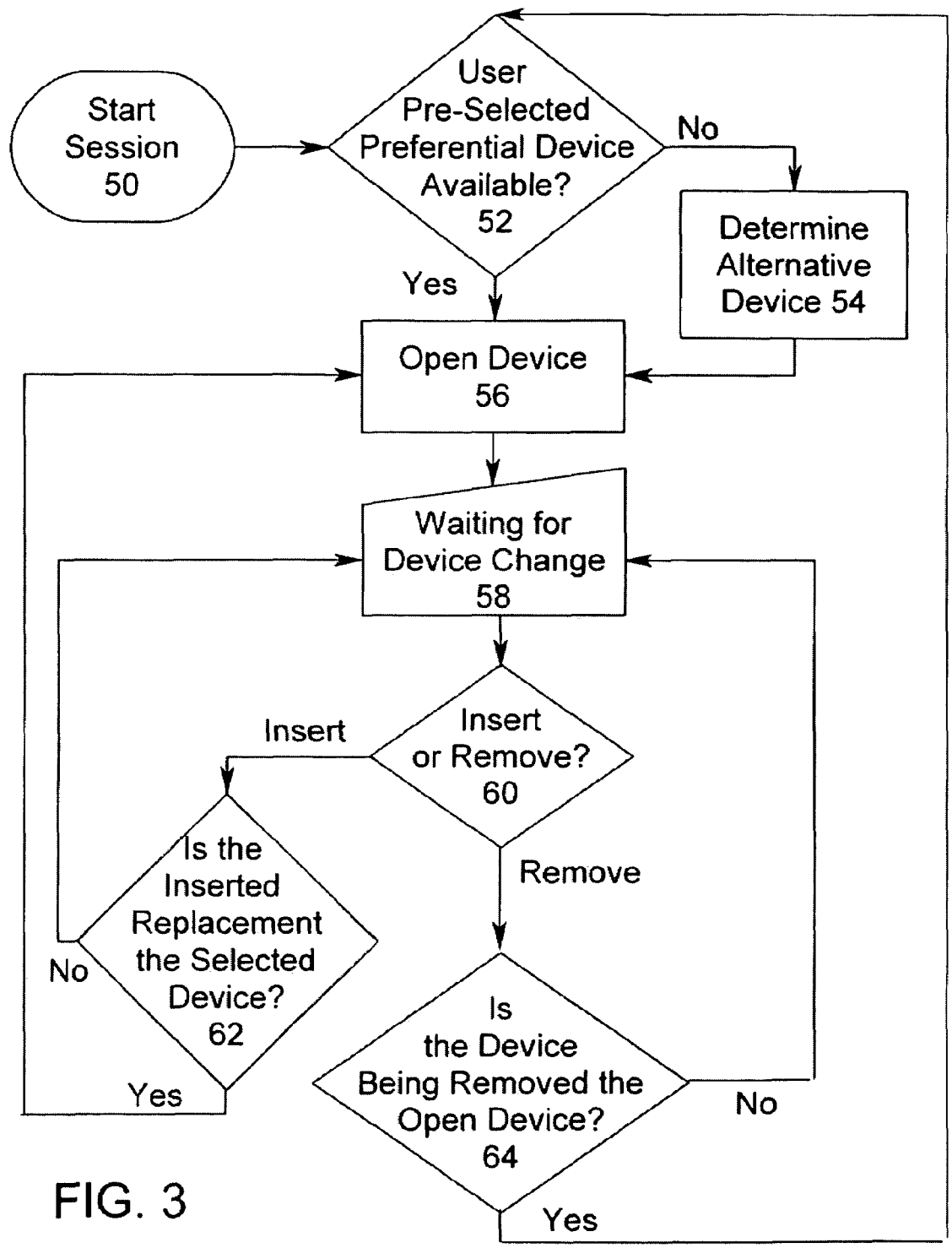
FIG. 3 is a flowchart showing a second exemplary telephony software client application of the present invention in which the inserted and/or removed logical audio device is a user pre-selected preferential logical audio device.

Two different exemplary preferred embodiments of the telephony software client application of the present invention are shown in FIGS. 2 and 3. FIG. 2 depicts a first preferred embodiment of the telephony software client application in which the logical audio device 20 (which can be the output and/or the input logical audio device 20) used is the default logical device 22. FIG. 3 depicts a second, equally preferred embodiment of a telephony software client application in which the logical audio device 20 used is a user pre-selected preferential logical audio device 26. It should be noted that the status of being the default logical device 22 and the status of being the pre-selected preferential logical audio device 26 are priority statuses.

The simplified flowchart shown in FIG. 2 shows an example of the logic used by the telephony software client application to handle insertion and/or removal of a logical audio device 20 (associated with a combination audio component) when it is the default logical device 22. If no logical audio devices 20 are inserted and/or removed, the client application continues waiting for notification of a logical audio device 20 insertion and/or removal, but does not make any changes. It should be noted that while the client application is in this waiting mode, the telephony software continues its normal functions of output and input of audio.

Figure 4A:
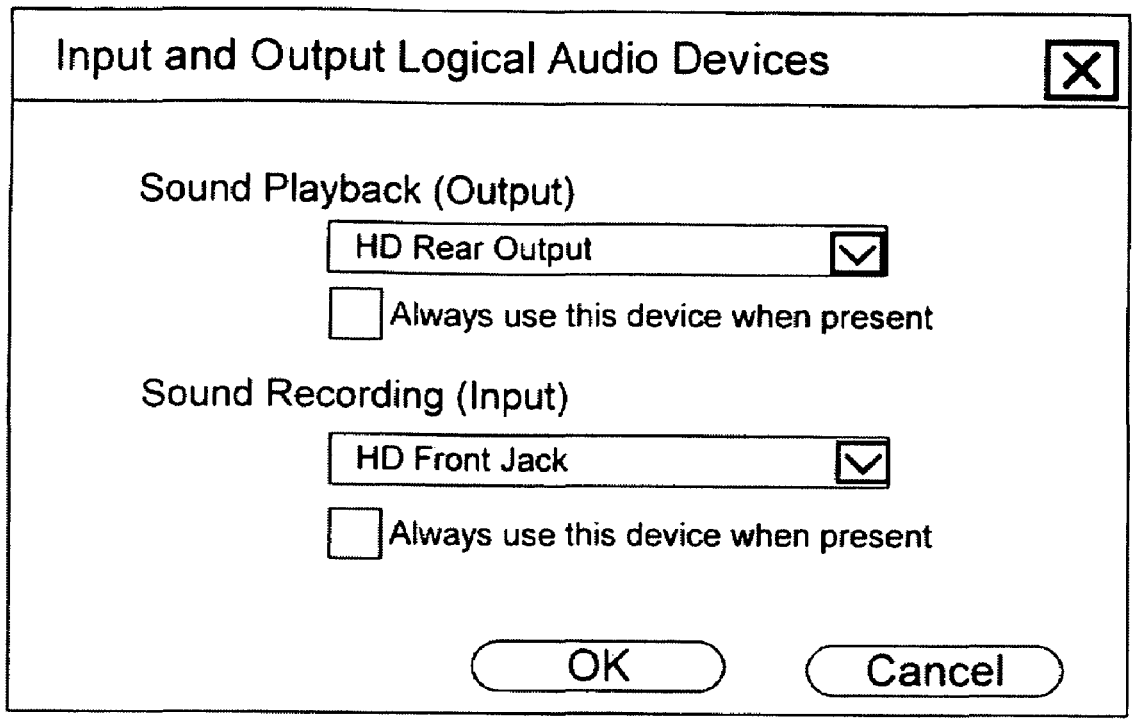
FIG. 4A is a simplified window showing exemplary logical audio devices present when a computer is initiated.
Figure 4B:
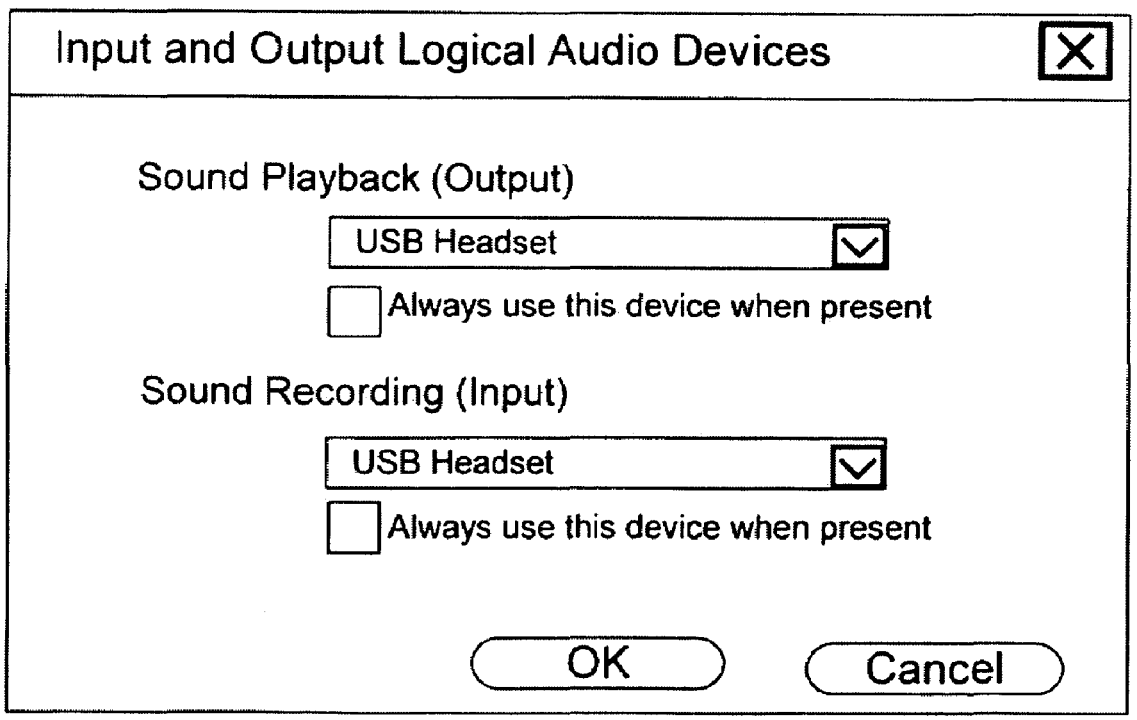
FIG. 4B is a simplified window after the insertion of a new exemplary dual-direction transducer combination audio component that replaces the previous exemplary logical audio devices present when the computer was initiated.

Insertion is handled as follows. At the beginning of a telephony session 30, this first preferred embodiment of the client application opens the operating system's default logical device 32. FIG. 4A shows a window with a contracted list of logical audio devices 20 present when a computer is initiated, the shown logical audio devices 20 (HD Rear Output and HD Front Jack) are the default logical devices 22. The client application waits for a logical audio device 20 insertion and/or removal (e.g. using polling or waiting for an interrupt from the operating system to signal that a logical audio device 20 has been added to the list of logical audio devices 20) 34. When the client application is notified (e.g. receives an interrupt or a result of the polling request) that a logical audio device 20 has been inserted 40, the client application determines if the new logical audio device 20 has been designated as the default logical device 22 (Is the Inserted Replacement the Default? 42). If the new logical audio device 20 has been designated as the default logical device 22, the client application closes the old logical audio device 20 and opens the new logical audio device 32. If the new logical audio device 20 has not been designated as the default logical device 22, the client application continues to use the old logical audio device 34. FIG. 4B shows a window with a contracted list of logical audio devices 20 after the insertion of a new exemplary dual-direction transducer combination audio component (USB Headset) that replaces the previous logical audio devices (HD Rear Output and HD Front Jack) as the default logical devices 22.

Removal is handled as follows. At the beginning of a telephony session 30, this first preferred embodiment of the client application opens the default logical device 32. The client application waits for a logical audio device 20 insertion and/or removal (e.g. using polling or waiting for an interrupt from the operating system to signal that a logical audio device 20 has been added to the list of logical audio devices 20) 34. When the client application is notified that a logical audio device 20 has been removed 40, the client application determines if the removed logical audio device 20 is the logical audio device that the telephony software is currently using (Is the Device Being Removed the Default? 44). It should be noted that, theoretically, the default logical device 22 will always be the logical audio device that the telephony software is currently using (the open logical audio device), however, it is possible that closed logical audio devices may be removed, but they would not be the default logical device 22. If the removed logical audio device 20 is not the default logical device 22, then the client application does not make any changes and continues waiting for notification of a logical audio device 20 insertion and/or removal. On the other hand, if the removed logical audio device 20 was the designated default logical device 22, then the client application preferably closes the old logical audio device 20 and opens the new logical audio device 20 which is now designated by the operating system as the default logical device 46. As discussed in the Background, how the operating system makes the determination of which remaining logical audio device 20 will be the default logical device 22 may be based on heuristics, component demands, and/or other default device determination factors.

The embodiment of FIG. 2 could also handle a change of the designated default logical device 22 (a change in priority status for a logical audio device) without having to stop and restart the telephony session. This is accomplished by waiting for a change of the designated default logical device 22 (e.g. using polling or waiting for an interrupt from the operating system). Graphically, this might be shown in the same flowchart box as "Waiting for Device Change 34," although the step of waiting for a change of the designated default logical device 22 could be done simultaneously, before, or after. When the client application is notified (e.g. receives an interrupt or a result of the polling request) of a change of the designated default logical device 22, the client application opens the newly designated default device 32 and then return to the waiting state 34. The prior art (known telephony software and operating systems) would not be able to handle this new designation automatically because the logical audio device 20 selection must be made at the time the telephony session starts. Using the prior art, the telephony session would have to be stopped and restarted.

Figure 5A:
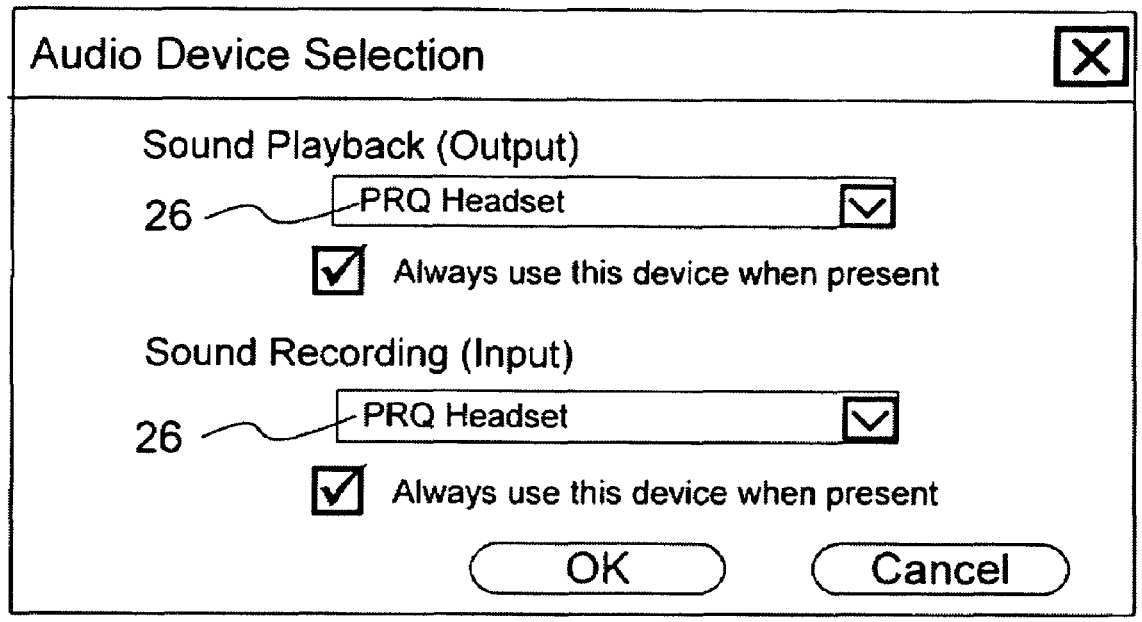
FIG. 5A is a simplified dialog window in which a user has pre-selected a preferential logical audio device.

The simplified flowchart shown in FIG. 3 shows an equally preferred example of the logic used by the telephony software client application to handle insertion and/or removal of a logical audio device 20 (associated with a combination audio component) when it is a user pre-selected preferential logical audio device 26. In this embodiment, the user may designate a pre-selected preferential logical audio device 26 that may be one of the logical audio devices 20 currently in the logical audio device list or it may be a logical audio device 20 that the user anticipates will be available. The "pre-selection" may be before, during, or after the start of the telephony session. The "pre-selected preferential logical audio device 26" is a separate variable element from the default logical device 22 that is handled by the operating system. The pre-selected preferential logical audio device 26 is requested by and stored by the client application. FIG. 5A shows a simplified Audio Device Selection dialog window in which a user has pre-selected preferential logical audio device 26 (the PRQ Headset). The pre-selected preferential logical audio device 26 may have the same "value" or designation of logical audio device 20 as the default logical device 22 (which is stored by the operating system). Also, if there is no pre-selected preferential logical audio device 26 or if the pre-selected preferential logical audio device 26 is not available, this embodiment would be able to determine an alternative device 54, which may be the default logical device 22 (which is stored by the operating system). If no logical audio devices 20 are inserted and/or removed, the client application continues waiting for notification of a logical audio device 20 insertion and/or removal, but does not make any changes. It should be noted that while the client application is in this "waiting mode" the telephony software continues its normal functions of output and input of audio.

Figure 5B:
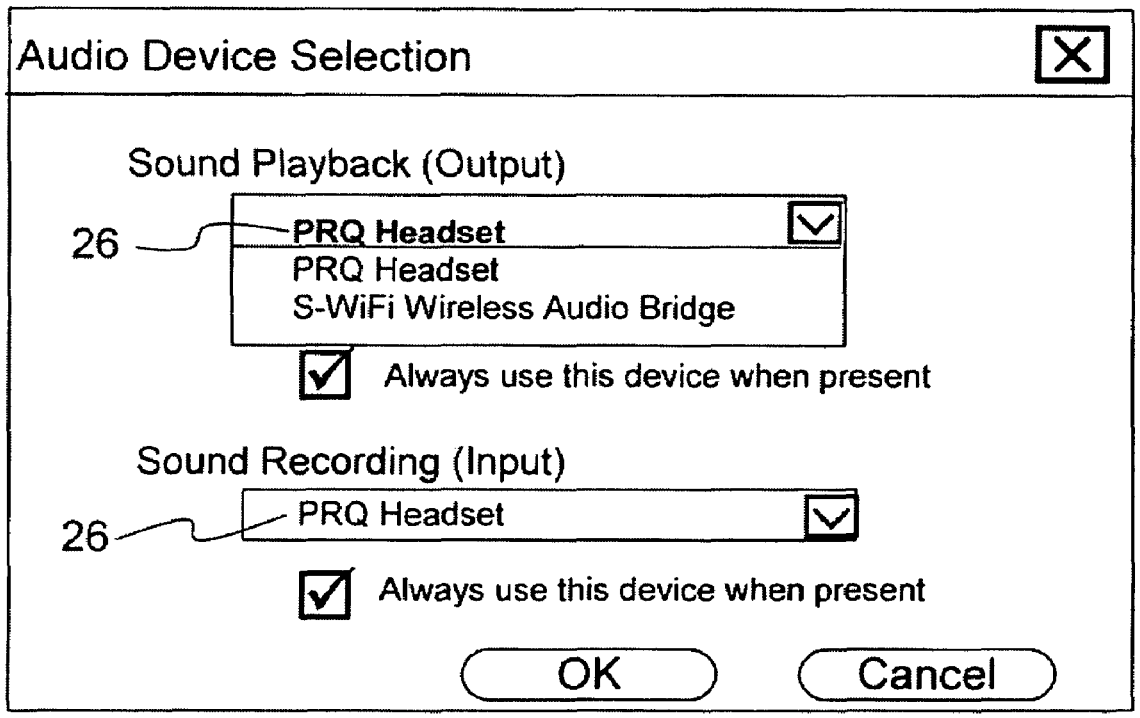
FIG. 5B is a simplified dialog window after the insertion of a combination audio component that is not the user's pre-selected preferential logical audio device.

Insertion is handled as follows. At the beginning of a telephony session 50, if the user pre-selected preferential logical audio device 26 is available 52 (i.e. plugged in), the client application Opens and uses 56 that pre-selected preferential logical audio device 26. If the pre-selected preferential logical audio device 26 is not available 52 (i.e. not plugged in), the client application determines an alternative logical audio device 54 (which may optionally be the default logical device 22) and opens and uses 56 that alternative logical audio device 20. The client application waits for a logical audio device 20 insertion and/or removal (e.g. using polling or waiting for an interrupt from the operating system to signal that a logical audio device 20 has been added to the list of logical audio devices 20) 58. When the client application is notified (e.g. receives an interrupt or a result of the polling request) that a logical audio device 20 has been inserted 60, the client application determines if the inserted logical audio device 20 matches the previously-selected logical audio device 26 (Is the Inserted Replacement the Selected Device? 62). If the new logical audio device 20 is the pre-selected preferential logical audio device, 22, the client application closes the old logical-audio device 20 and opens the new logical audio device 56. If the new logical audio device 20 is not the pre-selected preferential logical audio device 22, the client application continues to use the old logical audio device 58. FIG. 5B shows a simplified dialog window after the insertion of a combination audio component (the S-WiFi Wireless Audio Bridge) that is not the user's pre-selected preferential logical audio device 26.

Removal is handled as follows. At the beginning of a telephony session 50, if the user pre-selected preferential logical audio device 26 is available 52 (i.e. plugged in), the client application opens and uses 56 that pre-selected preferential logical audio device 26. If the pre-selected preferential logical audio device 26 is not available 52 (i.e. not plugged in), the client application determines an alternative logical audio device 54 (which May optionally be the default logical device 22) and opens and uses 56 the alternative logical audio device 20. The client application waits for a logical audio device 20 insertion and/or removal (e.g. using polling or waiting for an interrupt from the operating system to signal that a logical audio device 20 has been added to the list of logical audio devices 20) 58. When the client application is notified (e.g. receives an interrupt or a result of the polling request) that a logical audio device 20 has been removed 60, the client application determines if the removed logical audio device 20 is the logical audio device 20 that is currently in use (Is the Device Being Removed the Open device? 64). If the removed logical audio device 20 is not the logical audio device 20 that is currently in use (open), then the client application does not have to make any changes and may continue waiting for notification of a logical audio device 20 insertion and/or removal 58. (On the other hand, in alternative preferred embodiments, the client application may use this opportunity to see if the pre-selected preferential logical audio device 26 has become available 52.) On the other hand, if the removed logical audio device 20 is the logical audio device 20 that is currently in use (open), then the client application preferably closes the logical audio device 20 and opens the pre-selected preferential logical audio device 26 if it is available 52 or otherwise determines an alternative assuming replacement logical audio device 54. The assuming replacement logical audio device 20 may optionally be determined based on the logical audio device 20 now designated as the default logical device 22 or may be determined based on heuristics, component demands, and/or other default device determination factors. It should be noted that the priority status of the original removed logical audio device 20 is substantially irrelevant using the logic shown in FIG. 3. This is because if the original removed logical audio device 20 was closed before it was removed, its priority status would be irrelevant. Similarly, if the original removed logical audio device 20 was open before it was removed, it is being replaced and so it is the priority status of the assuming replacement logical audio device 20 that would become relevant.

The embodiment of FIG. 3 could also handle a change of the designated default logical device 22 or a change in the selected preferential logical audio device 26 (a change in priority status for a logical audio device) without having to stop and restart the telephony session. This is accomplished by waiting for a change of the designated default logical device 22 or a change in the selected preferential logical audio device 26 (e.g. using polling or waiting for an interrupt from the operating system). Graphically, this might be shown in the same flowchart box as "Waiting for Device Change 58," although the step of waiting for a change of the designated default logical device 22 could be done simultaneously, before, or after. When the client application is notified (e.g. receives an interrupt or a result of the polling request) of a change of the designated default logical device 22 or a change in the selected preferential logical audio device 26, the client application would determine if the newly selected preferential device is available 52 and open the newly selected preferential logical audio device 26 or designated default device 56 (if it is available), and then return to the waiting state 58. The prior art (known telephony software and operating systems) would not be able to handle this. One preferred feature that the embodiment shown in FIG. 3 might include is a synchronization feature in which the selected preferential logical audio device 26 could be changed automatically if the user changes the default logical device 22 by selecting a new default logical device 22 using, for example, the operating system control panel.

In both preferred embodiments, there may be optional cleanup necessary if the currently-open logical audio device 20 is removed by the user. Similarly, the client application preferably closes the currently-open logical audio device 20 when it opens (e.g. before, during, or after) a newly inserted logical audio device 20. The step of opening an input (recording or capturing) logical audio device 20 may optionally include the step of starting audio capture from that logical audio device 20. The step of opening an output (playback or rendering) logical audio device 20 may optionally include the step of starting audio output to that logical audio device 20.

Exemplary Code for a First Preferred Embodiment

The following sections of code show a first preferred implementation of the present invention. This code at least roughly follows logic of the flowchart of FIG. 2 in that it is directed to an embodiment in which an exemplary telephony software client application handles the dynamic insertion and removal of one or more logical audio devices 20. In this embodiment, the inserted and/or removed logical audio device is the default logical device 22 designated by the operating system. It should be noted, however, that the code is meant to be exemplary and is not meant to limit the scope of the invention.

---

Hirad1.cpp

```
#include "stdafx.h"
#define MAXDEVICENAME 256
// Get the OS's current default logical device. (FIG. 2, step 32.)
extern void GetDefaultDevice(char *DeviceName);
// Open the logical audio device for audio output and/or input.
(FIG. 2, step 32.)
extern void OpenDevice(const char *DeviceName);
// Close a logical audio device.
extern void CloseDevice(const char *DeviceName);
// Check to see if a new logical audio device was inserted and
// get the logical audio device if TRUE. (FIG. 2, step 34.)
extern BOOL NewDeviceInserted(char *DeviceName);
// Check to see if a logical audio device was removed and
// get the logical audio device if TRUE. (FIG. 2, step 34.)
extern BOOL DeviceRemoved(char *DeviceName);
// Start the VOIP engine and use the opened logical audio device indicated.
extern void StartAudioEngine(const char *DeviceName);
// Stop the audio engine.
extern void StopAudioEngine(void);
// Check to see if the call is over.
extern BOOL HangUp(void);
void CallAudioLoop(void)
{
  char currentDevice[MAXDEVICENAME];
  // Open default logical device.
  GetDefaultDevice(currentDevice);
  OpenDevice(currentDevice);
  StartAudioEngine(currentDevice);
```

-continued

Hirad1.cpp

```
  while(!HangUp( ))
  {
    char device[MAXDEVICENAME];
    // Logical audio device change: new logical audio device inserted?
    (FIG. 2, step 40.)
    if (NewDeviceInserted(device))
    {
      char defaultDevice[MAXDEVICENAME];
      // New default logical device. (FIG. 2, step 42.)
      GetDefaultDevice(defaultDevice);
      if (strcmp(defaultDevice, device) == 0)
      {
        // Close the old logical audio device.
        StopAudioEngine( );
        CloseDevice(currentDevice);
        // Open the new default logical device. (FIG. 2, steps 42 and 32.)
        strcpy(currentDevice, device);
        OpenDevice(currentDevice);
        StartAudioEngine(currentDevice);
      }
    }
    // Logical audio device change: Logical audio device removed?
    (FIG. 2, step 40.)
    if (DeviceRemoved(device))
    {
      // Was the removed logical audio device the current one being used?
      (FIG. 2, step 44.)
      if (strcmp(currentDevice, device) == 0)
      {
        // Close the removed logical audio device.
        StopAudioEngine( );
        CloseDevice(currentDevice);
        // Open the new default logical device. (FIG. 2, step 32.)
        GetDefaultDevice(currentDevice);
        OpenDevice(currentDevice);
        StartAudioEngine(currentDevice);
      }
    }
    // Wait 100 milliseconds before checking again.
    Sleep(100);
  }
  // Call has ended: close the logical audio device.
  StopAudioEngine( );
  CloseDevice(currentDevice);
}
```

---

The end user telephony software and/or client application will typically have nothing special to indicate that a device change event took place. A window in the control panel may be opened and reviewed to see changes to the logical audio device and the logical audio device list. FIG. 4A, for example, shows a window showing the logical audio devices 20 present when the computer is initiated (e.g. the HD Rear Output and the HD Front Jack). FIG. 4B shows a window after the insertion of a new dual-direction transducer combination audio component (e.g. a USB headset) that replaces the previous output logical audio device 20 (e.g. the HD Rear Output) and the previous input logical audio devices 20 (e.g. the HD Front Jack).

A specialized logging window, typically used for debugging, may also be referenced to indicate that the logical audio device list was changed. The logging window might contain textual entries. The following five-line logging window (Logging Window #1) is an exemplary logging window showing the insertion of a new dual-direction transducer combination audio component (e.g. a USB headset) that replaces the previous output logical audio device 20 (e.g. the HD Rear Output) and the previous input logical audio devices 20 (e.g. the HD Front Jack).

| Logging Window #1 |
| --- |
| Apr. 5, 2008 21:00:55.558: INFO - New device inserted "USB Headset"<br>Apr. 5, 2008 21:00:55.572: INFO - Closing waveout device "HD Rear Output"<br>Apr. 5, 2008 21:00:55.572: INFO - Closing wavein device "HO Front Jack"<br>Apr. 5, 2008 21:00:55.572: INFO - Opening waveout device "USB Headset"<br>Apr. 5, 2008 21:00:55.572: INFO - Opening wavein device "USB Headset" |

The following five-line logging window (Logging Window #2) is an exemplary logging window showing the removal of a dual-direction transducer combination audio component (e.g. the USB headset) and the dual-direction transducer combination audio component being replaced with an output logical audio device 20 (e.g. the HD Rear Output) and an input logical audio devices 20 (e.g. the HD Front Jack).

| Logging Window #2 |
| --- |
| Apr. 5, 2008 21:01:22.312: INFO - Opened device removed "USB Headset"<br>Apr. 5, 2008 21:01:22.356: INFO - Closing waveout device "USB Headset"<br>Apr. 5, 2008 21:01:22.356: INFO - Closing wavein device "USB Headset"<br>Apr. 5, 2008 21:01:22.356: INFO - Opening waveout device "HD Rear Output"<br>Apr. 5, 2008 21:01:22.356: INFO - Opening wavein device "HD Front Jack" |

Exemplary Code for a Second Preferred Embodiment

The following sections of code show a second preferred implementation of the present invention. This code at least roughly follows logic of the flowchart of FIG. 3 in that it is directed to an embodiment in which an exemplary telephony software client application handles the dynamic insertion and removal of one or more logical audio devices 20. In this embodiment, the inserted and/or removed logical audio device is the user pre-selected preferential logical audio device. It should be noted, however, that the code is meant to be exemplary and is not meant to limit the scope of the invention.

| Hirad2.cpp |
| --- |
| ```
#include "stdafx.h"
#define MAXDEVICENAME 256
// Get the logical audio device selected by the user
// from the config screen. (FIG. 3, steps 50 and 52.)
extern void GetSelectedDevice(char *DeviceName);
// Determine if a particular logical audio device is available.
// (FIG. 3, step 54.)
extern BOOL IsDeviceAvailable(const char *DeviceName);
// Get the OS's current default logical device. (FIG. 3, step 54.)
extern void GetDefaultDevice(char *DeviceName);
// Open the logical audio device for audio output and/or input.
// (FIG. 3, step 56.)
extern void OpenDevice(const char *DeviceName);
// Close a logical audio device.
extern void CloseDevice(const char *DeviceName);
``` |

| Hirad2.cpp |
| --- |
| ```
// Check to see if a new logical audio device was inserted and
// get the logical audio device if TRUE. (FIG. 3, step 58.)
extern BOOL NewDeviceInserted(char *DeviceName);
// Check to see if a logical audio device was removed and
// get the logical audio device if TRUE. (FIG. 3, step 58.)
extern BOOL DeviceRemoved(char *DeviceName);
// Start the VOIP engine and use the opened logical audio device indicated.
extern void StartAudioEngine(const char *DeviceName);
// Stop the audio engine.
extern void StopAudioEngine(void);
// Check to see if the call is over.
extern BOOL HangUp(void);
void CallAudioLoop(void)
{
  char currentDevice[MAXDEVICENAME];
  // See if the selected logical audio device is unavailable.
  GetSelectedDevice(currentDevice);
  if (!IsDeviceAvailable(currentDevice))
  {
    // Determine alternative logical audio device
    // (Use default logical device for this.)
    GetDefaultDevice(currentDevice);
  }
  // Open the logical audio device.
  OpenDevice(currentDevice);
  StartAudioEngine(currentDevice);
  while(!HangUp( ))
  {
    char device[MAXDEVICENAME];
    // Logical audio device change:
    // new logical audio device inserted? (FIG. 3, steps 58 and 60.)
    if (NewDeviceInserted(device))
    {
      char selectedDevice[MAXDEVICENAME];
      // Is the new logical audio device the selected logical audio device?
      // (FIG. 3, step 62.)
      GetSelectedDevice(selectedDevice);
      if (strcmp(selectedDevice, device) == 0)
      {
        // Close the old logical audio device.
        StopAudioEngine( );
        CloseDevice(currentDevice);
        // Open the new selected logical audio device. (FIG. 3, step 56.)
        strcpy(currentDevice, device);
        OpenDevice(currentDevice);
        StartAudioEngine(currentDevice);
      }
    }
    // Logical audio device change:
    // Logical audio device removed? (FIG. 3, steps 58 and 60.)
    if (DeviceRemoved(device))
    {
      // Was the removed logical audio device the
      // current logical audio device being used? (FIG. 3, step 64.)
      if (strcmp(currentDevice, device) == 0)
      {
        // Close the removed logical audio device.
        StopAudioEngine( );
        CloseDevice(currentDevice);
        // Determine alternate logical audio device. (FIG. 3, step 54.)
        // (Use the default logical device.)
        GetDefaultDevice(currentDevice);
        // Open the logical audio device. (FIG. 3, step 56.)
        OpenDevice(currentDevice);
        StartAudioEngine(currentDevice);
      }
    }
    // Wait 100 milliseconds before checking again.
    Sleep(100);
  }
  // Call has ended: close the logical audio device.
  StopAudioEngine( );
  CloseDevice(currentDevice);
}
``` |

In this embodiment the telephony software and/or client application will include a GUI (shown as a dialog window in FIG. 5A and FIG. 5B) that allows a user to pre-select a preferential logical audio device 26. There are many advantages to this including, but not limited to the ability to pre-select a preferential logical audio device 26 that the user anticipates will be available, even if it is not available at the time the user pre-selects it. In other words, this embodiment of the client application has the ability to store information (e.g. in memory) about logical audio devices 20 and use the pre-selected preferential logical audio device 26 even if it is not present at the moment the telephony session was initiated. This is not possible with the prior art. The stored information may have originated from sources such as previously available logical audio devices, a database of logical audio devices (either stored on the device itself or accessible from the device itself), or manually input by the user (e.g. using an installation disk).

An example of how this feature might work would be to store logical audio device 20 information about a favorite headset (shown as the PRQ Headset in FIG. 5A) using the client application. The user would then pre-select the favorite headset as his preferential logical audio device 26 for both input and output. Whenever the favorite headset was inserted, the client application would automatically transfer audio input and output control to the favorite headset. If another logical audio device 20 was temporarily used for audio output, when the temporary logical audio device 20 removed, this embodiment of the client application would return control of audio output to the favorite headset as the pre-selected preferential logical audio device 26.

Miscellaneous

It should be noted that the present invention is described in terms of a "telephony session" using "telephony software." It should be noted, however, that an "output session" or an "input session" should be considered limited versions of a "telephony session." Specifically, an "output session" would be a "telephony session" in which there was no input and an "input session" would be a "telephony session" in which there was no output. Similarly, "output software" (e.g. for handling audio output) or "input software" (e.g. for handling audio input) should be considered limited versions of "telephony software." Specifically, "output software" would be "telephony software" in which there was no input and "input software" would be "telephony software" in which there was no output. The use of the terms "telephony session" and "telephony software" are meant to include the lesser elements.

Although many USB, WiFi, and Bluetooth combination audio components (and any audio source or sink using any communication protocol that the operating system can abstract as a logical audio device) would work with the present invention, the following are exemplary combination audio components that work with preferred embodiments of the present invention. An exemplary Bluetooth combination audio component is a Plantronics® Bluetooth headset. An exemplary Wi-Fi combination audio component is a Sondigo™ Sirocco™ Wireless Audio Bridge. Exemplary USB combination audio components include a C-Media™ USB Headphone Set, a Plantronics® USB Audio Adapter, and a Plantronics® USB Headset.

It should be noted that some of the operations referred to as being performed by the application client and/or by the telephony software may be handled by the operating system on behalf of the application client and/or by the telephony software and under instructions from the application client and/or the telephony software.

It should be noted that although exemplary GUIs have been shown and described, alternative GUIs could be used. For example, the dialog windows of FIGS. 5A and 5B could be replaced with drop-down menus accessible from the telephony software and/or from the client application.

It should be noted that although the present application is described as "software," alternative technologies are contemplated by this term including, but not limited to firmware and later developed technologies.

The terms and expressions that have been employed in the foregoing specification are used as terms of description and not of limitation, and are not intended to exclude equivalents of the features shown and described. This application is intended to cover any adaptations or variations of the present invention. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention which, as a matter of language, might be said to fall therebetween.

What is claimed is:

1. A method implemented by a client application for use with telephony software operating on a computer having an operating system and one or more logical audio devices, said client application for handling the insertion and removal of logical audio devices, said client application performing the method comprising the steps of:
   (a) opening a logical audio device having priority status as an open logical audio device;
   (b) waiting for notification of insertion or removal of a logical audio device;
   (c) if notification is received of the insertion of said logical audio device, said logical audio device is an inserted replacement logical audio device:
      (i) determining if said inserted replacement logical audio device has priority status,
      (ii) if said inserted replacement logical audio device has priority status, returning to said step of opening said logical audio device having priority status as said open logical audio device using said inserted replacement logical audio device as said logical audio device; and
      (iii) if said inserted replacement logical audio device does not have priority status, returning to said step of waiting for notification; and
   (d) if notification is received of the removal of said logical audio device, said logical audio device is an original removed logical audio device:
      (i) determining if said original removed logical audio device is said open logical audio device or if said original removed logical audio device has priority status;
      (ii) if said original removed logical audio device is not said open logical audio device or if said original removed logical audio device does not have priority status, returning to said step of waiting for notification; and
      (iii) if said original removed logical audio device is said open logical audio device or if said original removed logical audio device has priority status, returning to said step of opening said logical audio device having priority status as said open logical audio device using an assuming replacement logical audio device as said logical audio device.

2. The method of claim 1 wherein said priority status is a default status designated by said operating system.

3. The method of claim 1 wherein said priority status is a preferential status pre-selected by a user.

4. The method of claim 1 further comprising the steps of:
(a) waiting for notification of a change in priority status for a logical audio device; and
(b) if notification is received of the change in, priority status for a logical audio device, opening said logical audio device if it is available.

5. The method of claim 1 further comprising the step of closing logical audio devices that have been replaced or removed.

6. The method of claim 1 wherein said client application is integral with said telephony software.

7. The method of claim 1, said step of waiting for notification of the insertion or removal of a logical audio device further comprising the step of receiving an interrupt.

8. The method of claim 1, said step of waiting for notification of the insertion or removal of a logical audio device further comprising the steps of polling and receiving the answer to said polling.

9. A method implemented by a client application for use with telephony software operating on a computer having an operating system and one or more logical audio devices, said client application for handling the insertion and removal of logical audio devices, said client application performing the method comprising the steps of:
(a) opening a logical audio device having default priority status as an open logical audio device;
(b) waiting for notification of insertion or removal of a logical audio device;
(c) if notification is received of the insertion of said logical audio device, said logical audio device is an inserted replacement logical audio device:
   (i) determining said inserted replacement logical audio device has default priority status;
   (ii) if said inserted replacement logical audio device has default priority status, returning to said step of opening said logical audio device having default priority status as said open logical audio device using said inserted replacement logical audio device as said logical audio device; and
   (iii) if said inserted replacement logical audio device does not have default priority status, returning to said step of waiting for notification; and
(d) if notification is received of the removal of said logical audio device, said logical audio device is an original removed logical audio device:
   (i) determining if said original removed logical audio device has default priority status;
   (ii) if said original removed logical audio device does not have default priority status, returning to said step of waiting for notification; and
   (iii) if said original removed logical audio device has default priority status, said operating system assigning an assuming replacement logical audio device to have default priority status, and returning to said step of opening said logical audio device having default priority status as said open logical audio device using said assuming replacement logical audio device as said logical audio device.

10. The method of claim 9 further comprising the steps of:
(a) waiting for notification of a change in said default priority status for a logical audio device; and
(b) if notification is received of the change in said default priority status for a logical audio device, opening said logical audio device if it is available.

11. The method of claim 9 further comprising the step of closing logical audio devices that have been replaced or removed.

12. The method of claim 9 wherein said client application is integral with said telephony software.

13. The method of claim 9, said step of waiting for notification of the insertion or removal of a logical audio device further comprising the step of receiving an interrupt.

14. The method of claim 9, said step of waiting for notification of the insertion or removal of a logical audio device further comprising the steps of polling and receiving the answer to said polling.

15. A method implemented by a client application for use with telephony software operating on a computer having an operating system and one or more logical audio devices, said client application for handling the insertion and removal of logical audio devices, said client application performing the method comprising the steps of:
(a) opening a logical audio device as an open logical audio device;
(b) waiting for notification of insertion or removal of a logical audio device;
(c) if notification is received of the insertion of said logical audio device, said logical audio device is an inserted replacement logical audio device:
   (i) determining if said inserted replacement logical audio device has preferential priority status;
   (ii) if said inserted replacement logical audio device has preferential priority status, returning to said step of opening said logical audio device having preferential priority status as said open logical audio device using said inserted replacement logical audio device as said logical audio device; and
   (iii) if said inserted replacement logical audio device does not have preferential priority status, returning to said step of waiting for notification; and
(d) if notification is received of the removal of said logical audio device, said logical audio device is an original removed logical audio device:
   (i) determining if said original removed logical audio device is said open logical audio device;
   (ii) if said original removed logical audio device is not said open logical audio device, returning to said step of waiting for notification; and
   (iii) if said original removed logical audio device is said open logical audio device, said client application using a logical audio device having preferential priority status as an assuming replacement logical audio device or providing an assuming replacement logical audio device, and returning to said step of opening said logical audio device as an open logical audio device using said assuming replacement logical audio device as said logical audio device.

16. The method of claim 15 further comprising the steps of:
(a) waiting for notification of a change in said preferential priority status for a logical audio device; and
(b) if notification is received of the change in said preferential priority status for a logical audio device; opening said logical audio device if it is available.

17. The method of claim 15 further comprising the step of closing logical audio devices that have been replaced or removed.

18. The method of claim 15 wherein said client application is integral with said telephony software.

19. The method of claim 15, said step of waiting for notification of the insertion or removal of a logical audio device further comprising the step of receiving an interrupt.

20. The method of claim 15, said step of waiting for notification of the insertion or removal of a logical audio device further comprising the steps of polling and receiving the answer to said polling:

* * * * *